April 4, 1950 R. MULDROW, III ET AL 2,503,126
METHOD OF APPLYING LEGENDS TO MAP DETAIL SHEETS
Filed March 1, 1946 2 Sheets-Sheet 1

April 4, 1950   R. MULDROW, III ET AL   2,503,126
METHOD OF APPLYING LEGENDS TO MAP DETAIL SHEETS
Filed March 1, 1946   2 Sheets-Sheet 2

Patented Apr. 4, 1950

2,503,126

UNITED STATES PATENT OFFICE 2,503,126

METHOD OF APPLYING LEGENDS TO MAP DETAIL SHEETS

Robert Muldrow, III, and Zilmon J. Boothe, Jr., Midland, Tex.

Application March 1, 1946, Serial No. 651,096

2 Claims. (Cl. 35—40)

This invention relates to improvements in methods of applying legends to map detail sheets, and more particularly to the depicting of information on sheets and other supporting material in the form of maps.

Heretofore, it has been customary to delineate a map by the work of a highly skilled draftsman in plotting and drawing on a detail sheet the elements to be represented on the map. Not only is such map-making extremely tedious and slow, but it is not subject to material reduction or enlargement of size, whereby it has not been very satisfactory and yet is extremely expensive. Some attempts have been made to produce and use photographic maps, and although these show the landscape and objects on the surface of the area, they are not capable of use in compiling cadastral maps because they lack the designations of objects, and the plotting thereon of surveys, outlines, etc., which facilitate the intelligent use of cadastral maps.

It is an object of this invention to improve the character of map making processes by providing for the production thereof in a simple and effective manner without the usual tedious and time-consuming drafting, which will save an appreciable amount of time and cost, and which, nevertheless, will improve the results and character of the maps or like devices as produced.

A further object of the invention is to simplify and improve the construction of a map that depicts accurately a particular region, by having plotted thereon not only source material and man-made features but also outlines and other designations, symbols and the like, and which is capable of ready reproduction either on the same scale or on different scales as for enlarging or reducing in size as may be required.

In carrying out these objects, we prefer to produce on a detail sheet by tracing or drawing or otherwise depicting thereon all required outlines depending upon the particular type of map under construction, as well as of man-made features desired on the completed map, according to the area covered thereby. Designating material, such as words, lines, symbols, etc., are then produced photographically and adhesively applied over the detail sheet in the proper positions with respect to the outlines and matter depicted thereon. Then the resulting sheet may be accurately photographed to the desired scale, producing a negative from which the map may be reproduced in the usual manner, either in the same size or in any desired scale with respect thereto, larger or smaller. It is obvious that this produces accurately a superior type of map at an appreciable reduction in time and cost as compared with that obtained by a most skillful draftsman by means of the usual hand method.

The invention is illustrated generally in the accompanying drawings in which.

In carrying out the process of delineating a map, according to the present invention, we use any available source material and may use aerial photographs of the area to be delineated in the map, which aerial photographs preferably are made to the scale on which the map is to be prepared. Such aerial photographs, however, are not required, inasmuch as it is possible to use other source material, but aerial photographs are now conveniently available and may be used quickly and inexpensively, according to this invention.

Figure 1:
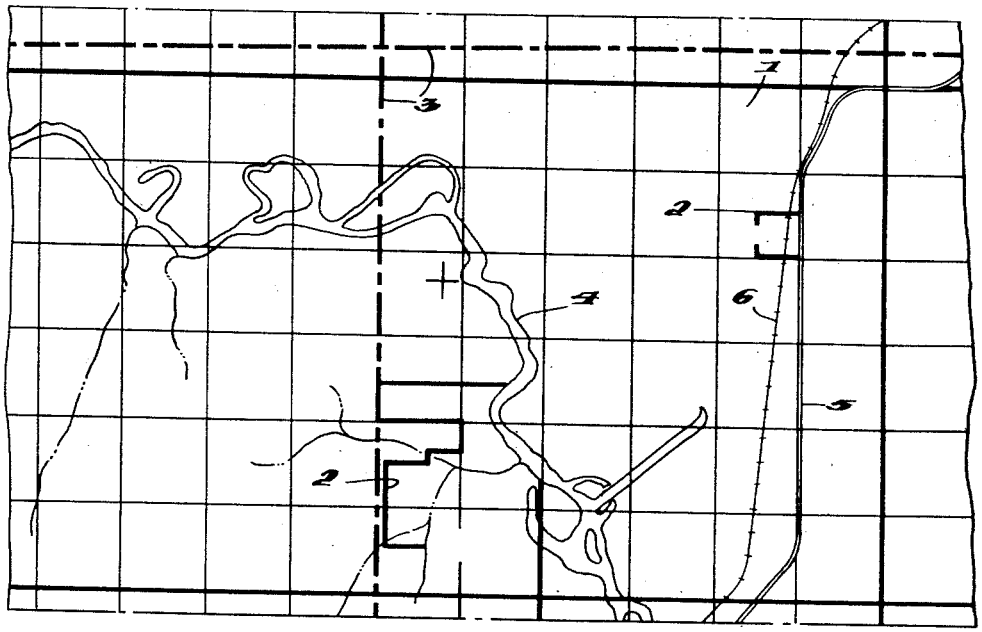
Fig. 1 is a plan view of a detail sheet having the initial outline depicted thereon.
Figure 2:
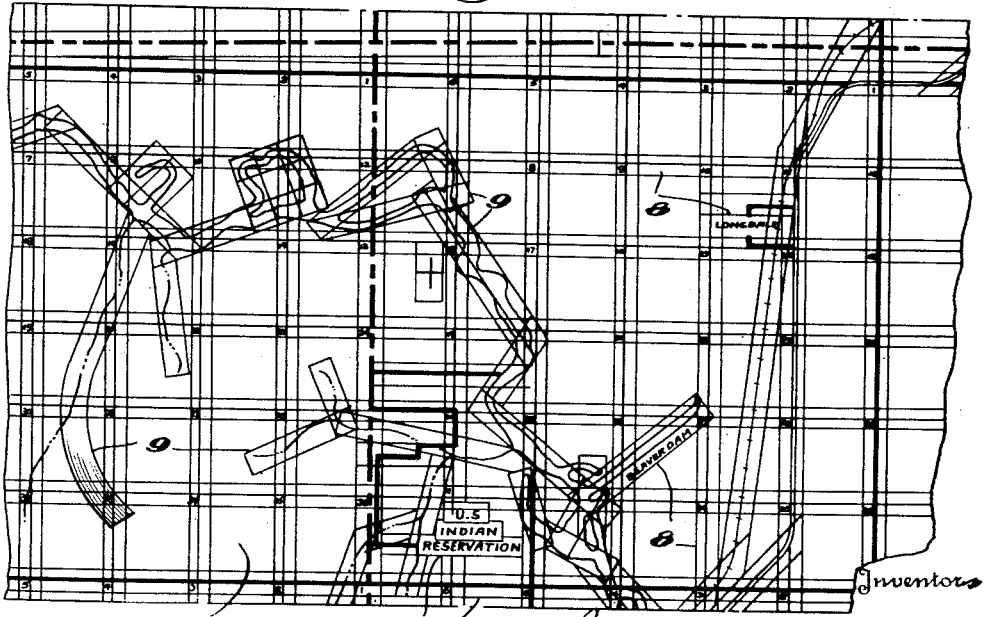
Fig. 2 is a plan view of the detail sheet having indicia applied thereto.

A detail sheet generally designated by the numeral 1, in Figs. 1 and 2, is used on which the map may be delineated, which detail sheet is preferably transparent to facilitate reproduction photographically. We have found that a transparent cellulose acetate mattesurfaced detail sheet is extremely practical for use, inasmuch as it lends itself readily to the depicting thereon of the original source material, and is very practical for use in reproducing the map photographically. However, other material may be used for the detail sheet in place of the cellulose acetate sheet mentioned, such as Celluloid, tracing cloth, tracing paper, vellum paper, "Pliofilm," or other transparent types of tracing material.

On the detail sheet 1 is traced, plotted or otherwise depicted the principal elements to be delineated on the map. These elements may be depicted in pencil or in ink as desired, but separate inking is not required where the lines are clear and distinct, thus saving the time of an additional operation usually required in mapmaking. Furthermore, the initial depicting of the outline of the principal features to be incorporated in the map, as illustrated generally in Fig. 1, may be accomplished quickly and these features may be readily assembled by placing the transparent detail sheet 1 over aerial photographs of the ground or other area being mapped which have been prepared according to the scale of the map being compiled.

Thus it is possible to prepare the initial pencilled delineation, according to Fig. 1, of the principal objects to be depicted by the map very simply and quickly without requiring a skilled draftsman for the purpose. The material thus depicted on the detail sheet may be of the character of the outlines of the land, township and range lines, surveys, sections, grants, etc., according to the required existing source material and the particular mapping project desired.

In the example illustrated in Fig. 1, this includes such material as township and range lines 2 and 3, a river 4, and like objects to be represented. It includes also all man-made features, such as roads or highways 5, and railroads 6, that may be depicted from aerial photographs or other source material.

Figure 4:
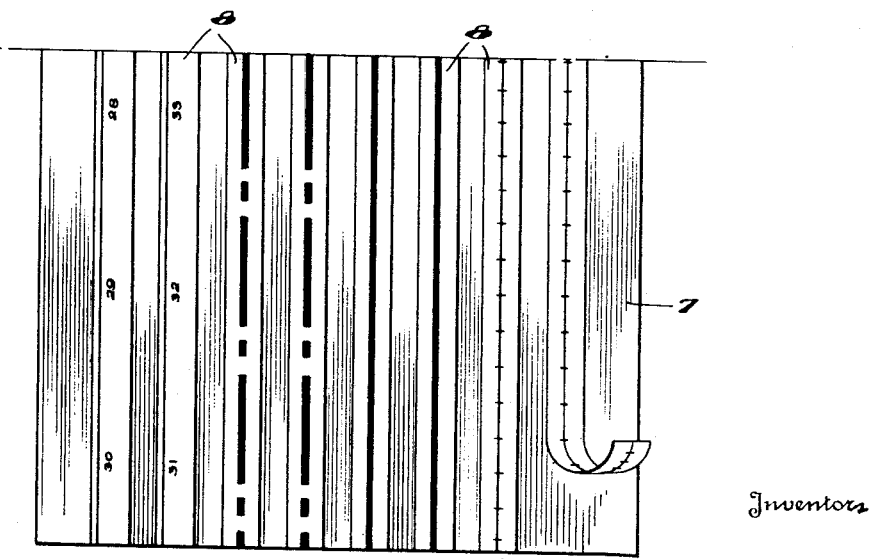
Fig. 4 is a plan view of indicia material used in the process.

The indicia to be applied to the detail sheet as thus delineated are preferably formed on stripping film which is a positive transparent strip of film initially applied to a supporting base, as generally illustrated in Fig. 4. The supporting base is shown at 7, having strips of film generally indicated at 8 applied thereto, but capable of being stripped off when required for use. These strips 8 are adhesively attached to the base 7, but upon removal therefrom may be coated with a transparent adhesive so as to be adhesively secured to the base or detail sheet 1 when applied thereon.

The indicia may comprise words, lines, numerals, symbols or other matter to be depicted on the map, and some of which are illustrated as examples in Fig. 4. Such indicia may be prepared from hand-drawn copy or from set type or other available source of material and copied by camera or photographic reproduction, and the resulting copy negatives are then printed on the stripping film 8, ready for use.

Such stripping film 8 is then removed from the base 7 and preferably coated with an adhesive on the back thereof to facilitate attachment to the detail sheet 1, as generally indicated at 8 in Fig. 2. This transfer may be facilitated by the application of a strip of "Scotch tape," applied over the strip 8 on the base 1, after which the stripping film will be pulled free from the base upon lifting of the "Scotch tape." Such "Scotch tape" is transparent and does not interfere with the photographic reproduction of the detail sheet when applied thereon but aids in protecting and holding the strip in place on the detail sheet. Likewise, "Scotch tape" may be applied over the drawn features on the base sheet 1, if desired, for protecting these lines, as indicated generally at 9 in Fig. 2, which is desired especially when these are drawn in pencil to prevent smearing the lines.

Figure 3:
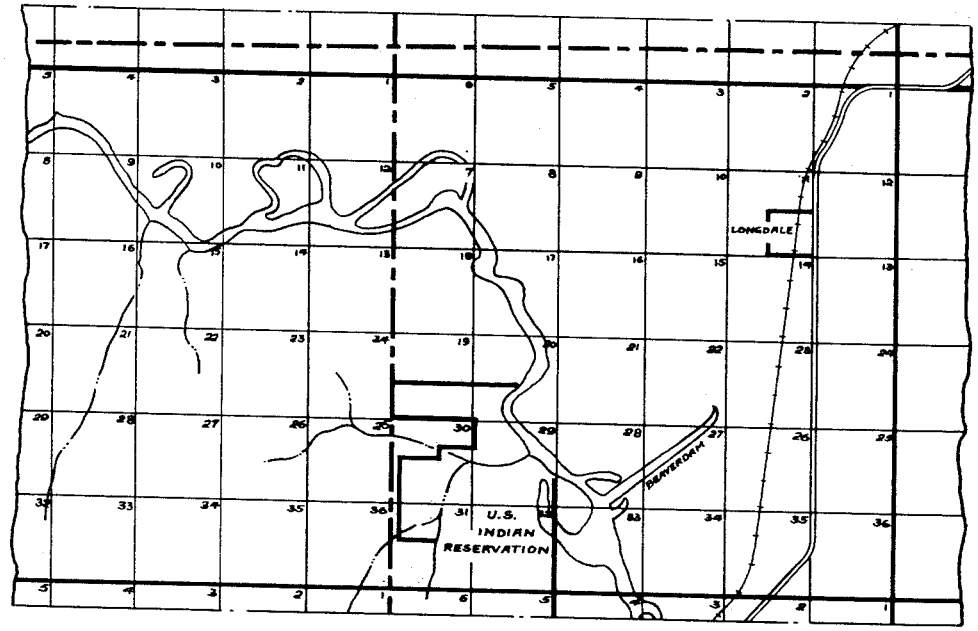
Fig. 3 is a similar view showing the completed map made therefrom.

The completed detail sheet with both the subject material and indicia applied thereto, according to that illustrated in Fig. 2, may be reproduced photographically to the desired size, either the same size as the detail sheet or on smaller or larger scale. It is preferable that this detail sheet be placed before a precise copy camera and photographed to the desired scale. This will produce a map negative on film. This map negative then may be used by the usual or known photographic processes for making map prints therefrom on cloth, paper, film, etc., one of which is illustrated in Fig. 3, substantially corresponding with the section shown in Fig. 2. It will be apparent therefrom that the transparent cover strips and film strips are not reproduced, except the lines and other indicia carried thereby. Any desired number of parts may be made, of course, from the negative and in the usual methods of reproduction as explained.

The detail sheet 1 may be delineated to depict legal records, such as original fees, grant and surveyed notes, the names of the owners of the respective fees and grants, the number of acres contained by each fee or grant, and such other information as may be desired thereon. Such information or indicia may be delineated and shown as explained above by the use of stripping film that may be adhesively applied to the detail sheet.

It will be evident that a map may be prepared according to this invention, which is not only far superior in character, but at a material reduction in time and cost as compared with the best existing character of map now compiled by competent experienced draftsmen using ordinary accepted methods in practice heretofore. The map prepared according to this invention, will also stand reduction through the means of a copy camera to comparatively small scale which has been impossible with maps prepared by ordinary means of drafting in practice heretofore.

It has been found from the actual practice of this process of preparing maps that it effects a saving of approximately 90% of the usual time, and in so doing materially reduces the cost, required by competent draftsmen to delineate and ink a like area. This process has been used effectively in the compilation of cadastral maps, usually referred to as "regional maps," "fee ownership maps," "combination maps," etc., used in the oil industry, but may be applied readily to the compilation of any type of line map or to any type of base as desired.

The invention has been described and illustrated as applied to a particular embodiment thereof, together with certain modifications specifically mentioned. However, it is recognized that other changes may be made in the process and in the article as desired without departing from the invention, except as hereinafter specifically defined in the claims.

We claim:

1. A method of applying a legend to a map detail sheet from a transparent legend strip having a legend thereon, comprising applying a transparent film having an adhesive surface on one side over the legend strip with the adhesive surface affixing the transparent film to the legend strip, transferring the legend strip to the map detail sheet while supported on the transparent film, and securing the legend strip on the map detail sheet by affixing the adhesive surface of said film to the map detail sheet.

2. A method of applying a legend to a map detail sheet from a transparent legend strip having a legend thereon, comprising applying a transparent film wider than the legend strip and having an adhesive surface on one side over the legend strip with the adhesive surface affixing the transparent film to the legend strip, transferring the legend strip to the map detail sheet while supported on the transparent film, and securing the legend strip on the map detail sheet by affixing the adhesive surface of said film at the projecting edges of said film to the map detail sheet.

ROBERT MULDROW, III.
ZILMON J. BOOTHE, Jr.

REFERENCES CITED

The following references are of record in the file of this patent:

UNITED STATES PATENTS

| Number | Name | Date |
|---|---|---|
| 1,630,916 | Wittenberg | May 31, 1927 |
| 2,200,203 | Heintz | May 7, 1940 |
| 2,291,683 | Boothe | Aug. 4, 1942 |
| 2,294,276 | Callinicos | Aug. 25, 1942 |
| 2,309,627 | Cooke | Feb. 2, 1943 |